United States Patent Office 3,796,754
Patented Mar. 12, 1974

---

3,796,754
5-SUBSTITUTED BENZOPHENONE HYDRAZONE COMPOUNDS AND PROCESS FOR THE PRODUCTION THEREOF
Minoru Shindo, Tokyo, Morio Kakimoto, Yono, and Hiroyuki Nagano, Ageo, Japan, assignors to Chugai Seiyaku Kabushiki Kaisha, Tokyo, Japan
No Drawing. Filed Apr. 10, 1972, Ser. No. 242,825
Claims priority, application Japan, Apr. 8, 1971, 46/21,427; Mar. 23, 1972, 47/28,555
Int. Cl. C07c *109/16*
U.S. Cl. 260—566 B        3 Claims

ABSTRACT OF THE DISCLOSURE 5-substituted benzophenone hydrazones which possess an activity on the central nervous system are disclosed. The 5-substituted benzophenone hydrazones are prepared by the reaction of 5-substituted benzophenones with hydrazine.

---

This invention relates, in one aspect, to 5-substituted benzophenone hydrazones of the general formula:

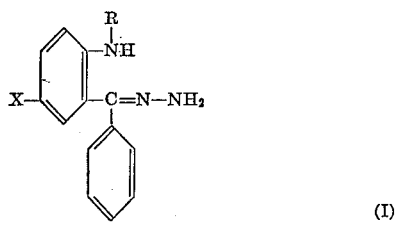

(I)

(wherein X is selected from the class consisting of nitro, hydroxyl, bromine and fluorine; R is selected from the class consisting of hydrogen and alkyl) and, in another aspect, to a process for producing 5-substituted benzophenone hydrazones.

The compounds represented by the above General Formula I are invariably novel compounds and, as demonstrated by various animal experiments, have superior and different CNS activities in comparison with the conventional CNS drugs, for example benzodiazepine derivatives. Furthermore, those beneficial activities are such that they have been little or not at all known in connection with the conventional benzodiazepine compounds. Thus, the compounds obtainable by the process of this invention are promising in that they might lead to the development of new, excellent CNS drugs.

The compounds represented by the Formula I have a neurotropic activity. Particularly, they act to depress the central nervous system and, therefore, are useful as sedative, tranquilizer, antidepressant antispastic and analgesic compounds. Depressive effect on the central nervous system of the compounds can be determined according to the method disclosed by W. L. Kuhn et al. "Journal of Pharmacology and Experimental Therapeutics," 134, 60 (1961), wherein the degree of depression is determined by observing the sleeping time in mice prolonged by the oral administration of these compounds followed by intraperitoneal injection of soluble hexobarbital (sodium salt of hexobarbital).

Analgesic activity of the compounds was determined either by the Electro-Stimulation Method of J. H. Burn et al. "Biological Standardization" Oxford University Press (1950), wherein these compounds are orally administered to mice followed by subjecting to electric stimulation, and counting the number of times stimulation is effected until the mice squeak, or by Acetic Acid Writhing Method according to R. Koster et al., "Federation Proceedings," 18, 412 (1969), wherein the compounds are orally administered to mice, then acetic acid is intraperitoneally injected into the mice and the decrease in depression of writhing of the mice caused by the intraperitoneal injection of acetic acid is observed.

Toxicity is measured by the oral administration of the compounds to mice followed by measuring a lethal dose which is indicated by "$LD_{50}$."

The results exhibit that all the compounds represented by the Formula I are effective. Some of the compounds are especially effective in prolonging central nervous system depression time (sleeping time); the depression time is 3 times that of the control, when they are administered in the level of 5 to 20 mg./kg. With respect to analgesic action, some of the compounds were found to have more than 1.5 times the depression ratio in comparison with the control group by the Electro-Stimulation Method as determined 45 to 90 minutes after administration of 100 mg./kg. On the other hand, more than 30% of depression ratio is observed according to the Acetic Acid Writhing Method.

Acute toxicity is observed with doses of 300 to 600 mg./kg. ($LD_{50}$).

Further, the biological activity of these hydrazones differs from that of benzodiazepine derivatives such as Diazepam. When 5–25 mg./kg. of the hydrazones is administered to mice to which 0.1 mg./head of Reserpin has been previously administered, the hypothermal activity of the mice is inhibited and the hydrazones exhibit effectiveness similar to the effect on biological activities effected by imipraine, one of the antidepressants.

The compounds represented by the Formula I may be administered orally intravenously or subcutaneously, if necessary, in the form of organic or inorganic acid addition salts. Though therapeutic dosage level of the compounds may be varied depending upon specific activity of the compounds and specific requirement, the dosage level is usually from 1 to 100 mg./kg. per each administration to a warm blooded animal. The compounds of this invention may be administered in the form of isotonic solution, elixir, suspension, capsule, tablet or powder which may be prepared by incorporating the compounds into usual solid or liquid carriers or excipients according to the conventional pharmaceutical practice.

The compounds represented by the above General Formula I can be produced by reacting a 5-substituted benzophenone of the general formula:

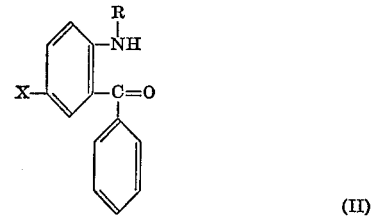

(II)

wherein X is selected from the class consisting of nitro, hydroxyl, bromine and fluorine; R is selected from the class consisting of hydrogen and alkyl, with hydrazine.

The hydrazine to be reacted with a 5-substituted benzophenone of General Formula II may be either anhydrous hydrazine or hydrazine hydrate. Compounds of General Formula I can be obtained in particularly good yields when anhydrous hydrazine and said 5-substituted benzophenone (II) are refluxed in anhydrous alcohol. In this case, the reaction can be carried to completion in a relatively short time if the reaction is conducted under pressure in a sealed tube or autoclave. When hydrazine hydrate is employed, the desired product can be obtained merely by refluxing the reactants in a solvent in the presence of an acid. The acid may be a mineral acid, such as hydrochloric acid or sulfuric acid, or an organic acid, such as acetic acid, although hydrochloric acid is the most desirable. The acid is preferably used in an amount such that the mixture of the reactants and the acid prior to the reaction will be alkaline. The solvent may be a low-boiling alcohol such as methanol or ethanol and need not be anhydrous.

The desired compounds can also be produced by the following methods, although these methods may not be more advantageous than those described above. Thus, one method may comprise heating a 5-substituted benzophenone compound of General Formula II and hydrazine hydrate together is a sealed tubular reaction at a high temperature; another method may comprise refluxing the reactants in a comparatively high-boiling solvent, e.g. diethylene glycol or n-butanol, for an adequate time; in still another method, one may reflux the reactants in ethanol while continuously removing water from the reaction system using a Soxhlet extractor.

Separation of the desired compound from the reaction mixture can be easily effected by a conventional procedure, e.g. crystallization by cooling or extraction with an organic solvent such as chloroform.

The desired compound can also be isolated in the form of an acid salt, e.g. the salt of picric acid or hydrochloric acid. If required, the compound can be purified by column chromatography on silica gel. While the proportion of hydrazine should be at least equimolar relative to the 5-substituted benzophenone, it is often advantageous to employ 40 to 100 moles of hydrazine per mole of the benzophenone.

The following examples are further illustrative of the process of this invention.

EXAMPLE 1

To 50 g. (0.181 mole) of 2-amino-5-bromobenzophenone is added 200 ml. of ethanol, followed by the addition of 200 ml. of ethanol saturated with hydrogen chloride. Then 400 g. of 100% hydrazine hydrate is added, further followed by the addition of 800 ml. ethanol. Under stirring, the mixture is refluxed for 7–8 hours. After the reaction has been completed, the reaction mixture is cooled to room temperature and chloroform is added. After washing with water, the extract is dried over sodium sulfate and concentrated under reduced pressure. Finally, ether is added to the concentrate, whereupon 2-amino-5-bromobenzophenone hydrazone is obtained as white crystals. The crystals are recovered by filtration and recrystallized from ether. The procedure gives crystals melting at 161–162° C.

*Elementary analysis.*—Calcd. for $C_{13}H_{12}BrN_3$ (percent): C, 53.81; H, 4.17; N, 14.48. Found (percent): C, 53.52; H, 3.96; N, 14.10.

EXAMPLE 2

To 50 g. (0.1723 mole) of 2-methylamino-5-bromobenzophenone is added 200 ml. of ethanol, followed by the addition of 200 ml. of ethanol saturated with hydrogen chloride. Then, 500 g. of 100% hydrazine hydrate and an additional 800 ml. of ethanol are added. With stirring, the mixture is refluxed for 7–8 hours. After the reaction has been completed, the mixture is cooled to room temperature and extracted with chloroform. The chloroform layer is washed with water, dried over sodium sulfate and concentrated under reduced pressure. Finally, ether is added to the oily residue, which is then allowed to stand at room temperature, whereupon colorless crystals of 2-methylamino-5-bromobenzophenone hydrazone are obtained. Recrystallization from chloroform-n-hexane gives crystals melting at 64–66° C.

*Elementary analysis.*—Calcd. for $C_{14}H_{14}BrN_3$ (percent): C, 55.28; H, 4.64; N, 13.81. Found (percent): C, 55.44; H, 4.76; N, 12.62.

EXAMPLE 3

To 30 g. (0.1308 mole) of 2-amino-5-fluorobenzophenone is added 120 ml. of ethanol, followed by the addition of 90 ml. ethanol saturated with hydrogen chloride and, then, 230 g. of 100% hydrazine hydrate. Then, 350 ml. of ethanol is added. Under stirring, the mixture is refluxed for 6 hours. After the reaction has been completed, the mixture is allowed to cool to room temperature and shaken together with chloroform. The chloroform layer is separated, washed with 3 portions of water, dried over sodium sulfate and concentrated under reduced pressure. Finally, ether is added to the concentrate, whereupon 2-amino-5-fluorobenzophenone hydrazone is obtained as white crystals. The crystals are recovered by filtration and recrystallized from chloroform-n-hexane. The procedure yields white needles melting at 115.5–117.0° C.

*Elementary analysis.*—Calcd. for $C_{13}H_{12}FN_3$ (percent): C, 68.11; H, 5.28; N, 18.33. Found (percent): C, 68.06; H, 5.12; N, 18.29.

EXAMPLE 4

To 15 g. (0.065 mole) of 2-methylamino-5-fluorobenzophenone is added 100 ml. of ethanol, followed by the addition of 60 ml. of ethanol saturated with hydrogen chloride and, then, 150 g. of 100% hydrazine hydrate. Then, 200 ml. of ethanol is further added. Under stirring, the mixture is refluxed for 7–8 hours. After the reaction has been completed, the mixture is allowed to cool to room temperature and shaken together with chloroform. The chloroform layer is separated, washed with 3 potions of water, dried over sodium sulfate and concentrated under reduced pressure. The concentrate is column-chromatographed (solvent systems: benzene and benzene-ether=1:1).

The eluate is collected and concentrated, followed by the addition of a mixture of ether and n-hexane. The mixture is allowed to stand overnight under cooling. The procedure yields pale yellowish crystals of 2-methylamino-5-fluorobenzophenone hydrazone. M.P. 77–78° C. (after recrystallization from ether-n-hexane).

*Elementary analysis.*—Calcd. for $C_{14}H_{14}FN_3$ (percent): C, 69.12; H, 5.80; N, 17.27. Found (percent): C, 69.23; H, 5.78; N, 17.25.

EXAMPLE 5

To 6.7 g. (0.0295 mole) of 2-amino-5-hydroxybenzophenone is added 30 ml. of ethanol saturated with hydrogen chloride, followed by the addition of 60 g. of 100% hydrazine hydrate. Then, 200 ml. of ethanol is added. The mixture is refluxed under stirring for 5 hours. After the reaction has been completed, the reaction mixture is allowed to cool to room temperature and extracted with ether. The etheric layer is washed with water, dried over sodium sulfate and concentrated under reduced pressure. The oily concentrate is column-chromatographed (solvent system; benzenechloroform-ether=1:1:1). The eluate is collected and concentrated under reduced pressure, followed by the addition of ether-n-hexane, whereupon 2-amino-5-hydroxybenzophenone hydrazone is obtained as yellow crystals. Recrystallization from ether-n-hexane gives crystals melting at 121–122° C.

*Elementary analysis.*—Calcd. for $C_{13}H_{13}N_3O$ (percent): C, 68.70; H, 5.77; N, 18.49. Found (percent): C, 68.40; H, 5.52; N, 18.15.

EXAMPLE 6

To 10 g (0.0413 mole) of 2-amino-5-nitrobenzophenone is added 50 ml. of ethanol, followed by the addition of 40 ml. ethanol-hydrogen chloride. Then, 150 g. of 100% hydrazine hydrate is added. At this moment, the mixture is basic due to the pressure of hydrazine. Then, 250 ml. of ethanol is added and the mixture is refluxed under stirring for 5–7 hours, whereupon the reaction mixture becomes deep brown. After the reaction has been completed, the reaction mixture is allowed to cool to room temperature and extracted with chloroform.

After washing with 3 portions of water, the chloroform layer is separated, dried over sodium sulfate and concentrated under reduced pressure. Finally, ether is added to the residue, whereupon 2-amino-5-nitrobenzophenone hydrazone is obtained as yellowish brown crystals. The crystals are recovered by filtration and recrystallized from chloroform-ether-n-hexane. M.P. 183° C.

*Elementary analysis.*—Calcd. for $C_{13}H_{12}N_4O_2$ (percent): C, 60.93; H, 4.72; N, 21.86. Found (percent): C, 60.98; H, 4.64; N, 21.67.

The etheric mother fluid remaining after the recovery of crystals is allowed to stand at room temperature overnight, whereupon orange-colored crystals separate out. Recrystallization gives crystals melting at 154–155° C. This product is an isomer of the 2-amino-5-nitrobenzophenone hydrazone obtained above.

*Elementary analysis.*—Calcd. for $C_{13}H_{12}N_4O_2$ (percent): C, 60.93; H, 4.72; N, 21.86. Found (percent): C, 60.61; H, 4.62; N, 21.59.

EXAMPLE 7

To 10 g. (0.0396 mole) of 2-methylamino-5-nitrobenzophenone is added 50 ml. of ethanol, followed by the addition of 45 ml. ethanol-hydrogen chloride. Then, 100 g. of 100% hydrazine hydrate is added. At this moment, the mixture is hydrazine-basic. Then, 150 ml. of ethanol is added and the mixture is refluxed under stirring for 5–7 hours, whereupon the reaction mixture becomes red in color. After the reaction has been completed, the reaction mixture is cooled to room temperature and chloroform is added. After washing with 3 portions of water, the chloroform layer is separated, dried over sodium sulfate and concentrated under reduced pressure. Finally, ether is added to the concentrate, whereupon 2-methylamino-5-nitrobenzophenone hydrozone is obtained as yellow needles. The crystals are recovered by filtration and recrystallized from chloroform-ether. M.P. 175–176° C.

*Elementary analysis.*—Calcd. for $C_{14}H_{14}N_4O_2$ (percent): C, 62.21; H, 5.22; N, 20.73. Found (percent): C, 61.96; H, 5.31; N, 20.49.

The etheric mother fluid after the recovery of crystals is allowed to stand at room temperature overnight, whereupon orange-colored crystals separate out. Recrystallization from chloroform-ether-n-hexane gives crystals melting at 135–136° C. This product is an isomer of the 2-methylamino-5-nitrobenzophenone hydrazone obtained above.

*Elementary analysis.*—Calcd. for $C_{14}H_{14}N_4O_2$ (percent): C, 62.21; H, 5.22; N, 20.73. Found (percent): C, 62.13; H, 5.22; N, 20.43.

What we claim is:

1. 5-nitrobenzophenone hydrazone compounds which are represented by the formula:

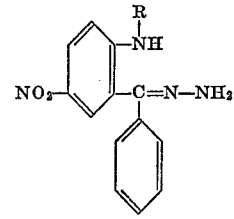

wherein R is a member of the group consisting of a hydrogen atom and a methyl radical.

2. 2-amino-5-nitrobenzophenone hydrazone in accordance with claim 1.

3. 2-methylamino-5-nitrobenzophenone hydrazone in accordance with claim 1.

References Cited

Sulkowski et al.: Medicinal Chem., vol. 7, p. 386 (1964).

Degering: "An Outline of Organic Nitrogen Compounds," p. 384 (1950).

Chem. Abstr., vol. 57, column 9856(h) (1962).

BERNARD HELFIN, Primary Examiner

G. A. SCHWARTZ, Assistant Examiner

U.S. Cl. X.R.

424—327